United States Patent [19]
Schmitcke

[11] Patent Number: 6,134,868
[45] Date of Patent: Oct. 24, 2000

[54] BALER PLUG REMOVING SYSTEM

[75] Inventor: Gerald L. Schmitcke, Menoken, N. Dak.

[73] Assignee: Inforcer, Inc., Newburg, N. Dak.

[21] Appl. No.: 09/226,671

[22] Filed: Jan. 7, 1999

[51] Int. Cl.⁷ .................................................. A01D 75/00
[52] U.S. Cl. ............................................... 56/341; 100/88
[58] Field of Search ............................. 56/341, 343, 432, 56/14.4, 364, 16.4 R, 220, 344; 100/88, 89

[56] References Cited

U.S. PATENT DOCUMENTS

| | | | |
|---|---|---|---|
| 4,413,553 | 11/1983 | Crawford | 100/4 |
| 4,433,619 | 2/1984 | Anstey et al. | 100/40 |
| 4,476,761 | 10/1984 | Bird | 83/614 |
| 4,516,389 | 5/1985 | Core | 56/341 |
| 4,782,652 | 11/1988 | White | 56/341 |
| 4,878,410 | 11/1989 | Darnell | 83/635 |
| 5,894,873 | 4/1999 | Weeks | 144/4.6 |

*Primary Examiner*—Thomas B. Will
*Assistant Examiner*—Nathan Mammen
*Attorney, Agent, or Firm*—Michael S. Neustel

[57] ABSTRACT

A baler plug removing system for unplugging a conventional hay baler without the user having to risk bodily injury or leave the comfort of the tractor cab. The system includes a bar member having an engaging face that is extendable between a pair of feed rollers, a plurality of wheels rotatably attached to the bar, a pair of opposing tracks that are secured to the conventional baler that receive the plurality of wheels, a pair of front bearing for guiding the front of the bar, a pair of rear bearings for guiding the rear of the bar, and a pair of hydraulic cylinders connected to the bar for extending/retracting the bar along the tracks. A plurality of push hooks are preferably connected to a rear portion of the bottom surface of the bar for pulling in hay from the pickup into the feed rollers. A plurality of pull hooks are preferably attached to the bottom surface of the bar adjacent the engaging face for pulling tightly compacted hay from between the feed rollers. It can be appreciated that other well-known ways of extending/retracting the bar along the tracks, such as an actuator chain gear system, may be utilized instead of a pair of hydraulic cylinders. When hay becomes plugged between the feed rollers of the conventional baler, the user actuates the pair of hydraulic cylinders that extend the bar into the feed rollers thereby pushing and severing the plugged hay. When the user retracts the bar the pull hooks catch upon the plugged hay drawing it away from the feed rollers thereby unplugging the baler without the user having to leave the tractor cab.

25 Claims, 4 Drawing Sheets

BALER PLUG REMOVING SYSTEM

BACKGROUND OF THE INVENTION

1. Field of the Invention

The present invention relates generally to baler devices and more specifically it relates to a baler plug removing system for unplugging a conventional hay baler without the user having to risk bodily injury or leave the comfort of the tractor cab.

Hay balers, particularly round hay balers, are notorious for plugging up in the front pickup portion and the feed rollers. Depending upon weather and hay conditions, sometimes the hay will wrap around the feed rollers. Other times the hay will "build up" in the pickup portion of the baler without entering the feed rollers. Typically, the user must turn off the power take-off to the baler and get out of the tractor to manually remove the plugged hay. During undesirable weather conditions, this can be physically demanding upon the user because of the immediate climate changes. Many users of balers find it easier to leave the power take-off engaged when attempting to unplug the baler. This is extremely dangerous and often leads to the user either losing a limb or becoming completely drawn into the baler usually leading to death of the user. Hence, there is a need for a baler plug removing system that eliminates the need for the user to leave the comfort of the tractor cab and risk bodily injury.

2. Description of the Prior Art

Balers have been in use for years. Typically, the conventional round baler will have a plurality of belts rotating about a plurality of rollers, a pickup for receiving the hay row, and a pair of opposing counter-rotating feed rollers that feed the hay from the pickup between the belts thereby forming the round bale. Often times the hay will become plugged within the pickup or the feed rollers making it difficult for the user to continue baling. The user must stop baling and manually unplug the baler. This is not only time consuming but also physically demanding upon the user. In addition, many farm accidents occur when a user is attempting to unplug the baler while the baler is still in operation. There currently is no system that allows a user to unplug a conventional baler without leaving the tractor cab.

Examples of attempted baler unpluggers include U.S. Pat. No. 4,516,389 to Core; U.S. Pat. No. 4,444,098 to Soteropulos; U.S. Pat. No. 5,447,022 to Webb; U.S. Pat. No. 4,782,652 to White; U.S. Pat. No. 4,604,858 to Esau et al; U.S. Pat. No 5,826,418 to Clostermeyer et al which are all illustrative of such prior art.

Core (U.S. Pat. No. 4,516,389) discloses a round hay-baling machine. Core teaches a pickup assembly, a wind guard assembly, a latch assembly, and a twine tie assembly that has an elongated cable at opposite ends of the twine tie and to the latch assembly. When the baler is unplugged, the twine tie assembly is actuated to pull the cable thereby releasing the latch assembly to allow the wind guard assembly to pivot away from the pickup assembly.

Soteropulos (U.S. Pat. No. 4,444,098) discloses a cylindrical baler with self-cleaning gate. Soteropulos teaches a frame with a pair of opposing sidewalls, a plurality of side-by-side endless belts on rollers, and a bale discharge gate.

Webb (U.S. Pat. No. 5,447,022) discloses a crop cutting apparatus for a round baler. Webb teaches a crop severing device that extends into the expandable chamber to cut crop material on the surface of the cylindrical package as it is being formed.

While these devices may be suitable for the particular purpose to which they address, they are not as suitable for unplugging a conventional hay baler without the user having to risk bodily injury or leave the comfort of the tractor cab. There currently is no system for unplugging a baler without the user having to physically remove the hay from the pickup and feed rollers.

In these respects, the baler plug removing system according to the present invention substantially departs from the conventional concepts and designs of the prior art, and in so doing provides an apparatus primarily developed for the purpose of unplugging a conventional hay baler without the user having to risk bodily injury or leave the comfort of the tractor cab.

SUMMARY OF THE INVENTION

In view of the foregoing disadvantages inherent in the known types of baler devices now present in the prior art, the present invention provides a new baler plug removing system construction wherein the same can be utilized for unplugging a conventional hay baler without the user having to risk bodily injury or leave the comfort of the tractor cab.

The general purpose of the present invention, which will be described subsequently in greater detail, is to provide a new baler plug removing system that has many of the advantages of the baler devices mentioned heretofore any many novel features that result in a new baler plug removing system which is not anticipated, rendered obvious, suggested, or even implied by any of the prior art baler devices, either alone or in any combination thereof.

To attain this, the present invention generally comprises a bar member having an engaging face that is extendable between a pair of feed rollers, a plurality of wheels rotatably attached to the bar, a pair of opposing tracks that are secured to the conventional baler that receive the plurality of wheels, a pair of front bearing for guiding the front of the bar, a pair of rear bearings for guiding the rear of the bar, and a pair of hydraulic cylinders connected to the bar for extending/retracting the bar along the tracks. A plurality of push hooks are preferably connected to a rear portion of the bottom surface of the bar for pulling in hay from the pickup into the feed rollers. A plurality of pull hooks are preferably attached to the bottom surface of the bar adjacent the engaging face for pulling tightly compacted hay from between the feed rollers. It can be appreciated that other well-known means of extending/retracting the bar along the tracks, such as an actuator chain gear system, may be utilized instead of a pair of hydraulic cylinders. When hay becomes plugged between the feed rollers of the conventional baler, the user actuates the pair of hydraulic cylinders that extend the bar into the bale feeding path between the feed rollers thereby pushing and removing the plugged hay. When the user retracts the bar the pull hooks catch upon the plugged hay drawing it away from the feed rollers thereby unplugging the baler without the user having to leave the tractor cab.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a baler plug removing system that will overcome the shortcomings of the prior art devices.

Another object is to provide a baler plug removing system that unplugs a conventional baler.

An additional object is to provide a baler plug removing system that can be added to an existing baler.

A further object is to provide a baler plug removing system that reduces the amount of "down time" incurred by unplugging the baler.

Another object is to provide a baler plug removing system that allows the user to unplug a baler without leaving the comfort of the tractor cab.

A further object is to provide a baler plug removing system that reduces the amount of injuries incurred by farmers from unplugging balers.

Another object is to provide a baler plug removing system is adaptable to most designs of balers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
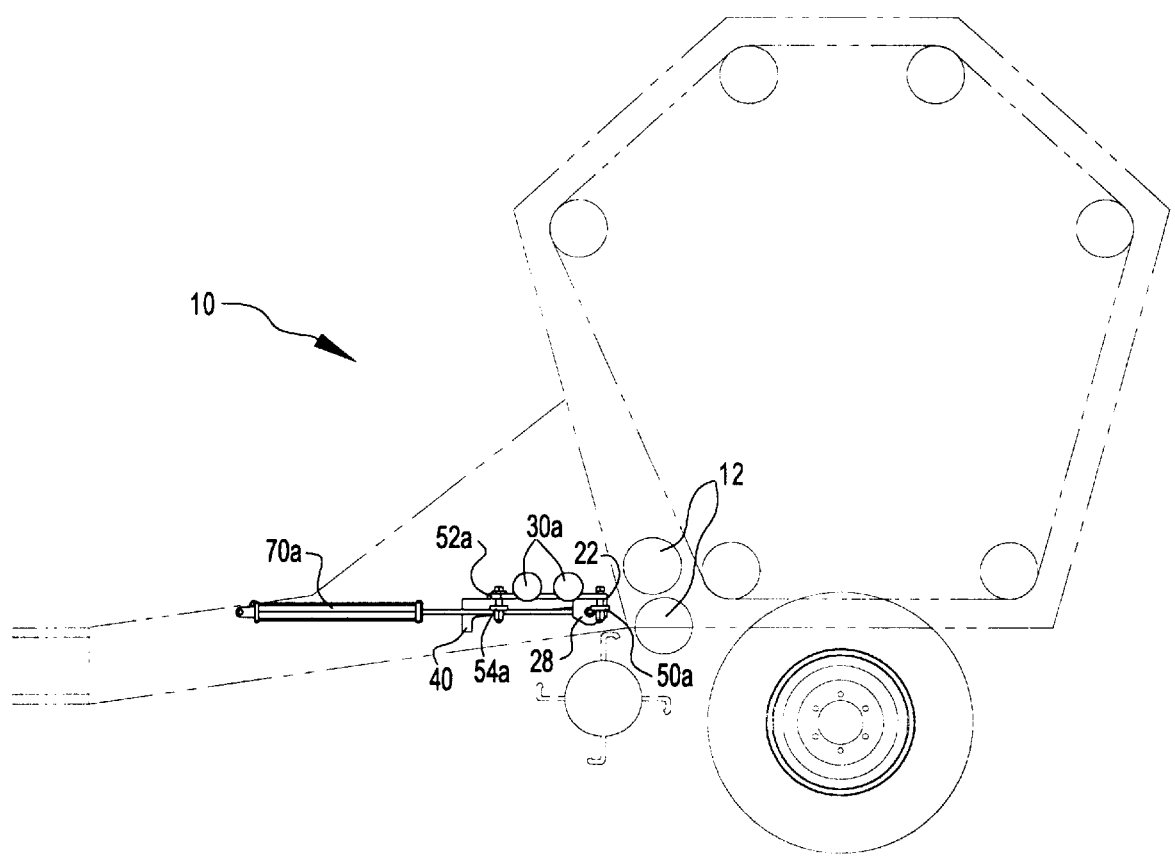
FIG. 1 is a side view of the present invention attached to a conventional round baler.

Turning now descriptively to the drawings, in which similar reference characters denote similar elements throughout the several views, FIGS. 1 through 4 illustrate a baler plug removing system 10, which comprises a bar 20 having a hay engaging face 22 that is extendable into the hay feed path between a pair of feed rollers 12, a plurality of wheels 30a–b rotatably attached to the bar 20, a pair of opposing tracks 60a–b that are secured to the conventional baler that receive the plurality of wheels 30a–b, a pair of front bearings for guiding the front of the bar 20, a pair of rear bearings 54a–b for guiding the rear of the bar 20, and a pair of hydraulic cylinders 70 connected to the bar 20 for extending/retracting the bar 20 along the tracks 60a–b. A plurality of push hooks 40 are preferably connected to a rear portion of the bottom surface 26 of the bar 20 for pulling in hay from the pickup into the feed rollers 12. A plurality of pull hooks 42 are preferably attached to the bottom surface 26 of the bar 20 adjacent the engaging face 22 for pulling tightly compacted hay from between the feed rollers 12. It can be appreciated that other well known means of extending/retracting the bar 20 along the tracks 60a–b, such as an actuator chain gear system, may be utilized instead of a pair of hydraulic cylinders 70. When hay becomes plugged between the feed rollers 12 of the conventional baler, the user actuates the pair of hydraulic cylinders 70 that extend the bar 20 into the hay feeding space between feed rollers 12 thereby pushing and forwardly extracting the plugged hay. When the user retracts the bar 20 the pull hooks 42 catch upon the plugged hay drawing it away from the feed rollers 12 thereby unplugging the baler without the user having to leave the tractor cab.

As best shown in FIG. 1, the present invention is attached to the underside of the hitch of the conventional baler. The tracks 60a–b are attached parallel to one another to the hitch along a plane that intersects the pair of feed rollers 12 on the conventional baler.

Figure 2:
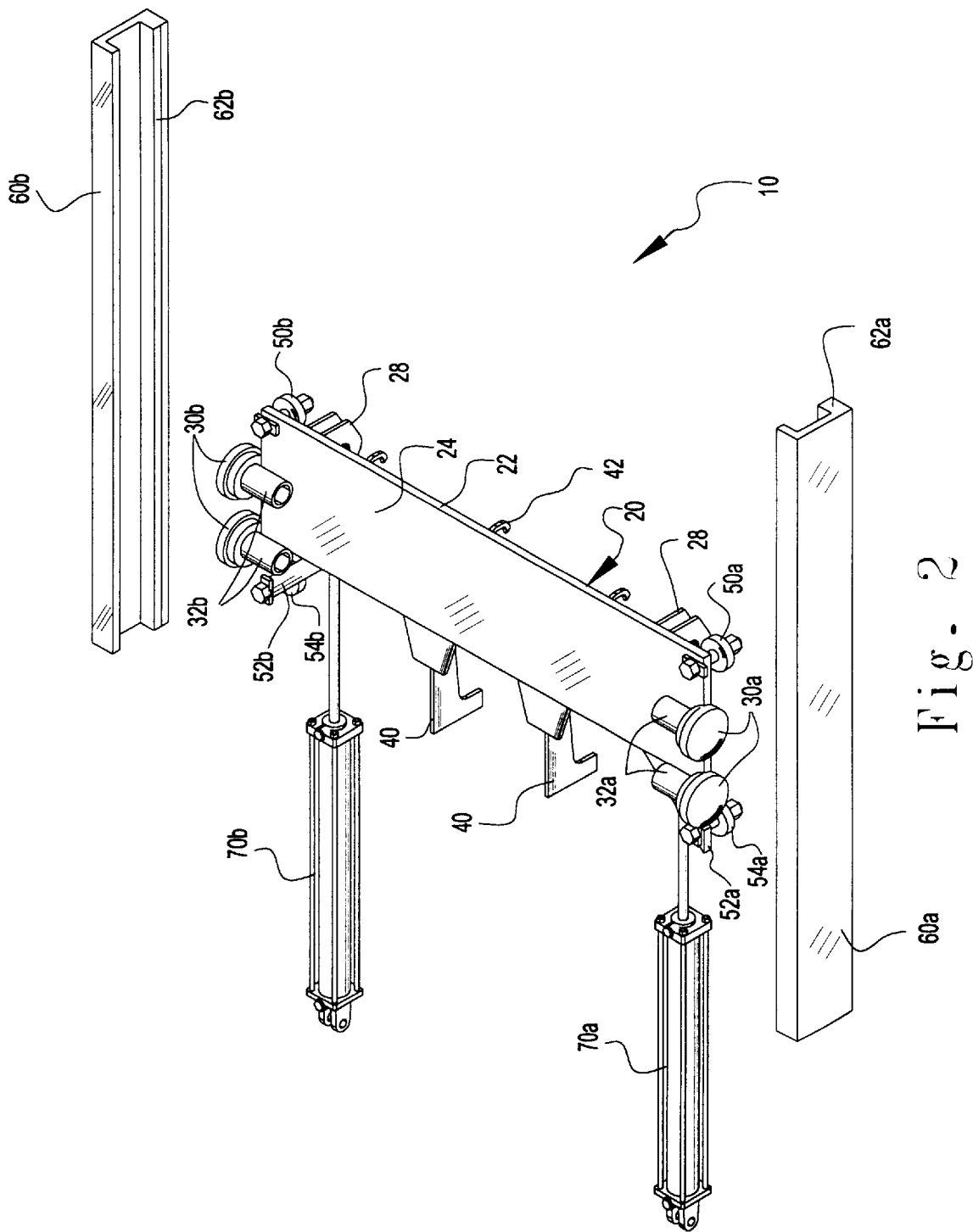
FIG. 2 is an exploded upper perspective view of the present invention.
Figure 3:
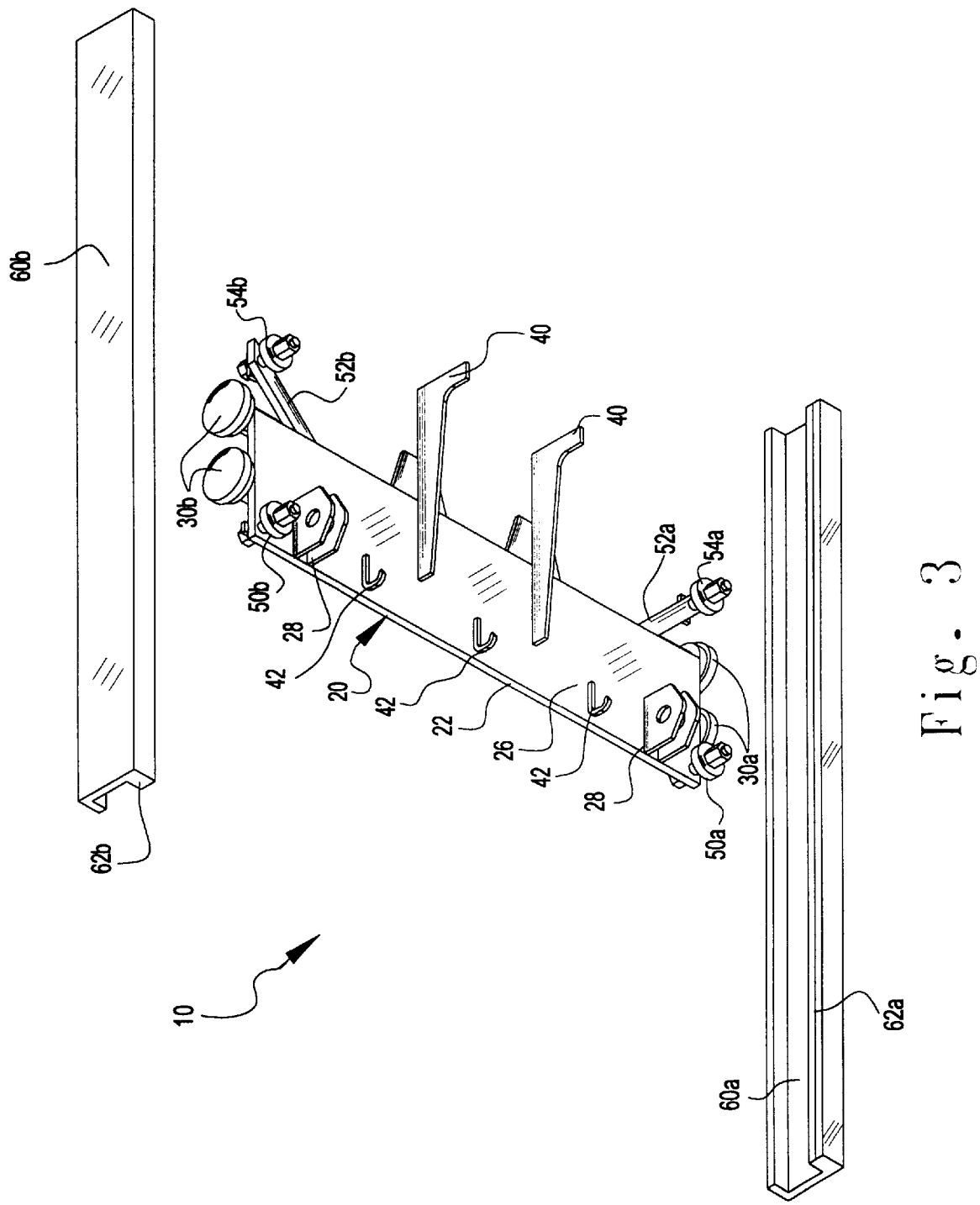
FIG. 3 is an exploded lower perspective view of the present invention.

As best shown in FIGS. 2 and 3 of the drawings, the bar 20 is preferably a flat plate structure. The bar 20 may be given the shape of a blade or similar structure. The bar 20 has an engaging end, a top surface 24 and a bottom surface 26. A pair of brackets 28 are attached to the bottom surface 26 of the bar 20 as shown in FIG. 3 of the drawings. The brackets 28 receive the pair of hydraulic cylinders 70 that are attached at the opposing ends to the hitch of the conventional baler.

As best shown in FIG. 2 of the drawings, a plurality of axles 32a–b are attached to the sides of the bar 20 that rotatably receive a corresponding plurality of wheels 30a–b. The wheels 30a–b are rotatably positioned within the tracks 60a–b as shown in FIG. 4 of the drawings thereby guiding the engaging face 22 of the bar 20 into the feed rollers 12 for removing the plugged hay.

As best shown in FIG. 3 of the drawings, a pair of front bearings 50a–b are rotatably attached to the bar 20 adjacent the engaging face 22. The pair of front bearings 50a–b engage the corresponding lip members 62a–b of the tracks 60a–b thereby guiding the engaging face 22 of the bar 20 and preventing the wheels 30a–b from becoming damaged during extreme forces applied to the bar 20 by the hydraulic cylinders 70. In addition, the front bearings 50a–b prevent binding of the bar 20 between the tracks 60a–b during uneven forces.

Figure 4:
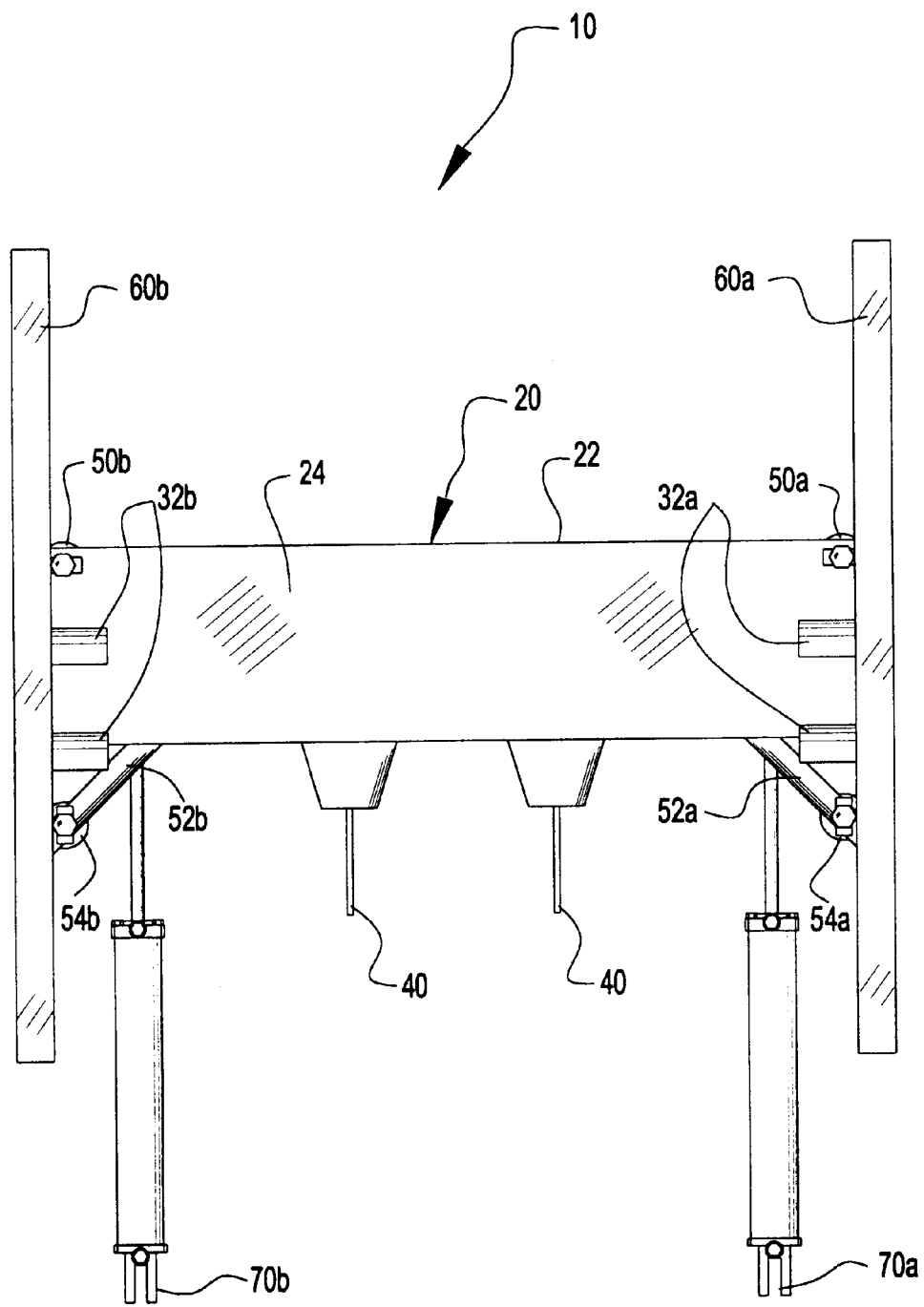
FIG. 4 is a top view of the present invention with the wheels positioned within the tracks.

As shown in FIGS. 3 and 4 of the drawings, a pair of arms 52a–b extend from the rear portion of the bar 20 toward the tracks 60a–b. A pair of rear bearings 54a–b are rotatably attached to the distal ends of the arms 52a–b thereby rotatably engaging the lip members 62a–b of the tracks 60a–b. The rear bearings 54a–b prevent sideways movements similar to the front bearings 50a–b, thereby maintaining the bar 20 substantially aligned during operation.

As shown in FIG. 3 of the drawings, a plurality of push hooks 40 are attached to the bottom surface 26 of the bar 20. The push hooks 40 engage hay that is remaining within the pickup portion of the conventional baler thereby pushing the hay into the feed rollers 12.

As also shown in FIG. 3 of the drawings, a plurality of pull hooks 42 are attached to the bottom surface 26 of the bar 20. The pull hooks 42 engage any compacted and plugged hay near the feed rollers 12 and pull the roller feed space.

As shown in FIGS. 1, 2 and 4 of the drawings, a pair of hydraulic cylinders 70 are attached to the pair of brackets 28. The hydraulic cylinders 70 are fluidly connectable to the hydraulic system of the tractor pulling the conventional baler.

In an alternative embodiment not shown in the figures, an actuator is connected to the hitch of the conventional baler. An elongated shaft extends from the actuator parallel to the bar 20. A pair of drive sprockets are attached to the proximal and distal ends of the shaft. A pair of idler sprockets are rotatably attached to the tracks 60a–b adjacent the pair of feed rollers 12. A pair of chains, each having a first end and a second end, are in engagement with the pair of drive sprockets respectively. The first end of the chains is secured to the rear portion of the bar 20. The chains then extend from the bar 20 toward and about the respective drive sprockets. The chains then extend toward and about the idler sprockets. The second end of the chains is then secured to the front portion of the bar 20. When the actuator rotates the shaft, the chain pulls the bar 20 into the feed rollers 12 or pulls the bar 20 away from the feed rollers 12.

In use, the user operates the conventional baler with the bar 20 in the retracted position so as to not interfere with the delivery of hay into the baler. When hay becomes plugged within the feed rollers 12 or the pickup of the baler, the operator stops the movement of the tractor but maintains the power take-off to the baler. The user then actuates the pair of hydraulic cylinders 70 so that they extend the engaging face 22 of the bar 20 into the feed rollers 12. The engaging face 22 does not physically engage the feed rollers 12, but rather comes within inches of the feed rollers 12 thereby forcing and severing any plugged hay into the feed rollers 12. The push hooks 40 engage any hay plugged into the front portion of the pickup thereby assisting in feeding the hay into the feed rollers 12. After the hydraulic cylinders 70 are fully extended, the user then actuates the hydraulic cylinders 70 so as to retract the bar 20 form the feed rollers 12. The pull hooks 42 engage any remaining hay about the feed rollers 12 thereby assisting in removing and loosening the plugged hay. If the plug still remains, the user will repeat the above process until the baler can be operated again. The hay engaging face 22 of the bar 20 may advantageously take the shape of a cutting edge which severs plugged hay as the bar 20 is moved into the hay feed space between feed rollers 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baler having a baler plug removing system, wherein said baler plug removing system comprises:

a pair of tracks that are attachable in spaced apart relation within said baler;

a bar having a hay engaging face movably positioned traversely between said pair of tracks, wherein said engaging face is extendable near a pair of hay feed rollers on said baler; and a reciprocally movable extension/retraction mechanism connected to the bar for moving the bar along the pair of tracks in a hay extracting motion.

2. The baler plug removing system of claim 1, including a plurality of wheels attached to opposing ends of said bar for rotatably engaging said pair of tracks.

3. The baler plug removing system of claim 2, including a pair of front bearings rotatably attached to said bar adjacent said engaging face, wherein said pair of front bearings rotatably engage said pair of tracks.

4. The baler plug removing system of claim 3, including a pair of rear bearings rotatably attached to said bar opposite of said engaging face, wherein said pair of rear bearings rotatably engage said pair of tracks.

5. The baler plug removing system of claim 4, wherein said pair of tracks each include a lip member for engaging said front bearings and said rear bearings.

6. The baler plug removing system of claim 1, including at least one push hook attached to said bar.

7. The baler plug removing system of claim 6, including at least one pull hook attached to said bar.

8. The baler plug removing system of claim 1, wherein said bar is a flat plate.

9. The baler plug removing system of claim 1, wherein said bar has a hay engaging edge defining said hay engaging face.

10. The baler plug removing system of claim 1, wherein said extension/retraction mechanism comprises at least one hydraulic cylinder.

11. A baler having a baler plug removing system, wherein said baler plug removing system comprises:

a pair of tracks that are attachable to said baler;

a bar having hay engaging face movably positioned between said pair of tracks, wherein said engaging face is extendable near a pair of feed rollers on said baler;

wherein said engaging face is tapered into a relatively sharp cutting edge; and an extension/retraction means connected to said bar for moving said bar along said pair of tracks.

12. The baler plug removing system of claim 11, including a plurality of wheels attached to opposing ends of said bar for rotatably engaging said pair of tracks.

13. The baler plug removing system of claim 12, including a pair of front bearings rotatably attached to said bar adjacent said engaging face, wherein said pair of front bearings rotatably engage said pair of tracks.

14. The baler plug removing system of claim 13, including a pair of rear bearings rotatably attached to said bar opposite of said engaging face, wherein said pair of rear bearings rotatably engage said pair of tracks.

15. The baler plug removing system of claim 14, wherein said pair of tracks each include a lip member for engaging said front bearings and said rear bearings.

16. The baler plug removing system of claim 11, including at least one push hook attached to said bar.

17. The baler plug removing system of claim 16, including at least one pull hook attached to said bar.

18. The baler plug removing system of claim 11, wherein said bar is a flat plate.

19. The baler plug removing system of claim 11, wherein said bar has a hay engaging edge defining said hay engaging face.

20. The baler plug removing system of claim 11, wherein said extension/retraction mechanism comprises at least one hydraulic cylinder.

21. A baler plug removing system attachable and operable within a conventional baler, comprising:

- a pair of tracks that are attachable in spaced apart relation within said baler;
- a bar having a hay engaging face movably positioned traversely between said pair of tracks, wherein said engaging face is extendable near a pair of hay feed rollers on said baler;
- at least one push hook attached to said bar;
- a reciprocally movable extension/retraction mechanism connected to the bar for moving the bar along the pair of tracks in a hay extracting motion;
- a plurality of wheels attached to opposing ends of said bar for rotatably engaging said pair of tracks;
- a pair of front bearings rotatably attached to said bar adjacent said engaging face, wherein said pair of front bearings rotatably engage said pair of tracks;
- a pair of rear bearings rotatably attached to said bar opposite of said engaging face, wherein said pair of rear bearings rotatably engage said pair of tracks;
- wherein said pair of tracks each include a lip member for engaging said front bearings and said rear bearings.

22. The baler plug removing system of claim 21, including at least one pull hook attached to said bar.

23. The baler plug removing system of claim 21, wherein said bar is a flat plate.

24. The baler plug removing system of claim 21, wherein said bar has a hay engaging edge defining said hay engaging face.

25. The baler plug removing system of claim 21, wherein said extension/retraction mechanism comprises at least one hydraulic cylinder.

* * * * *